UNITED STATES PATENT OFFICE.

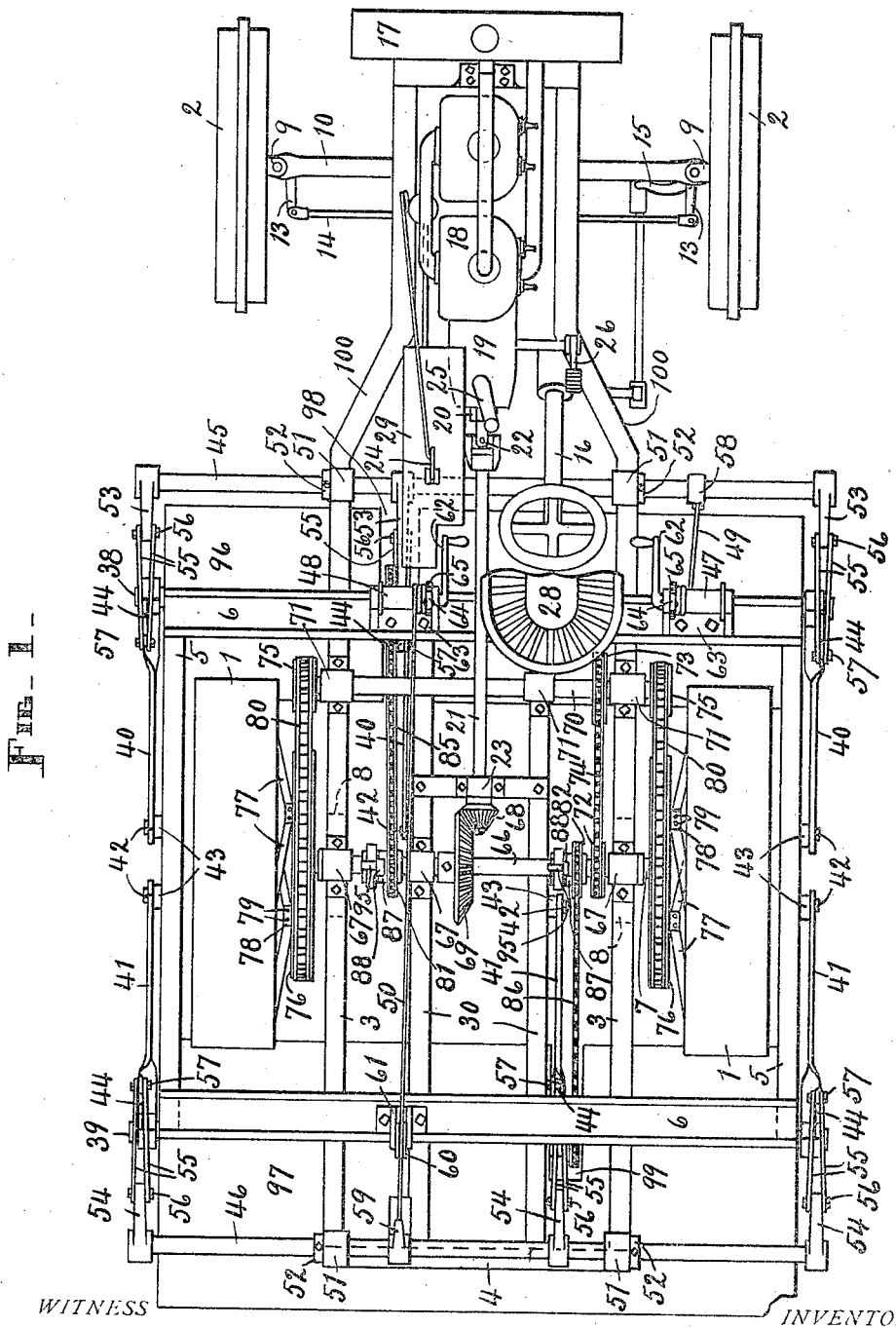

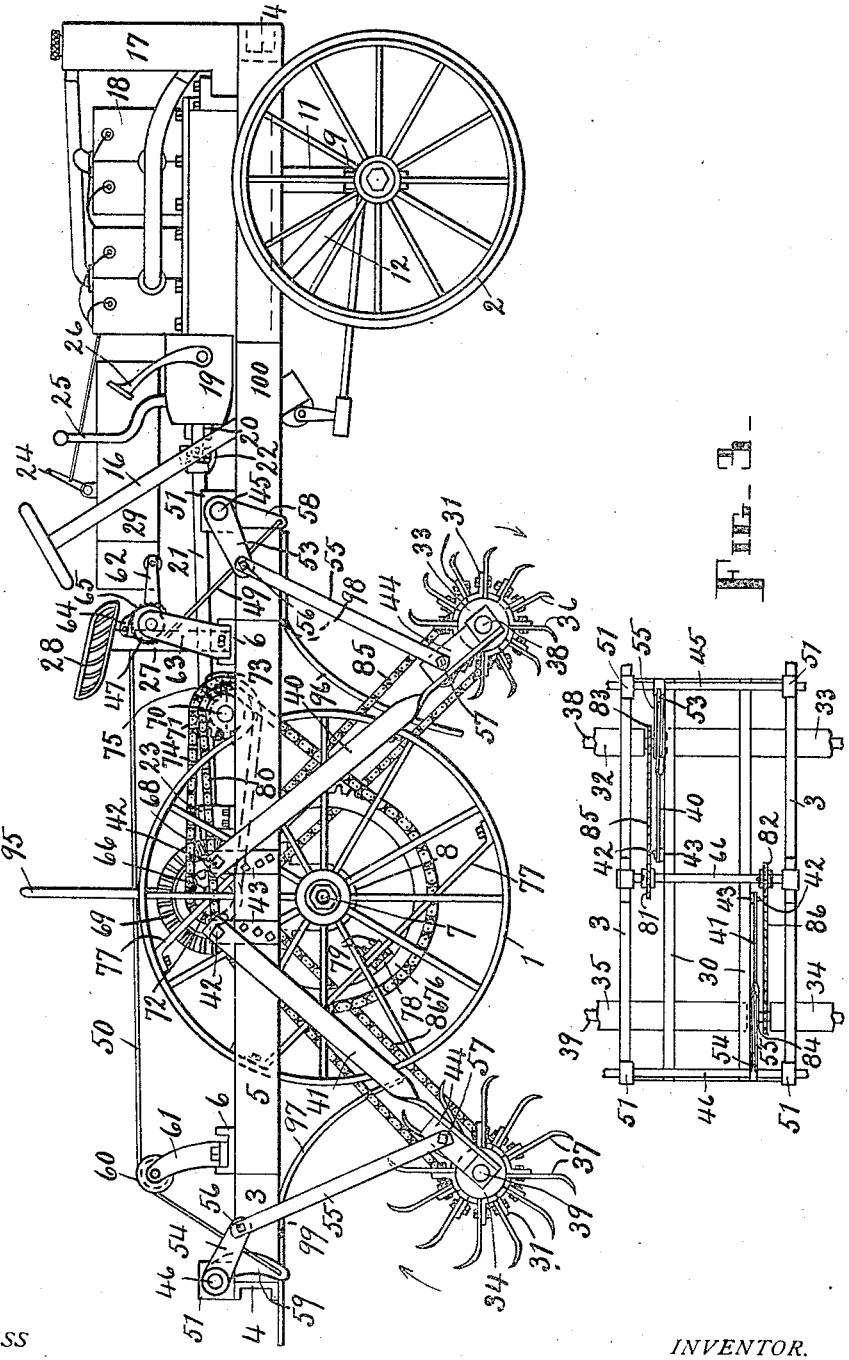

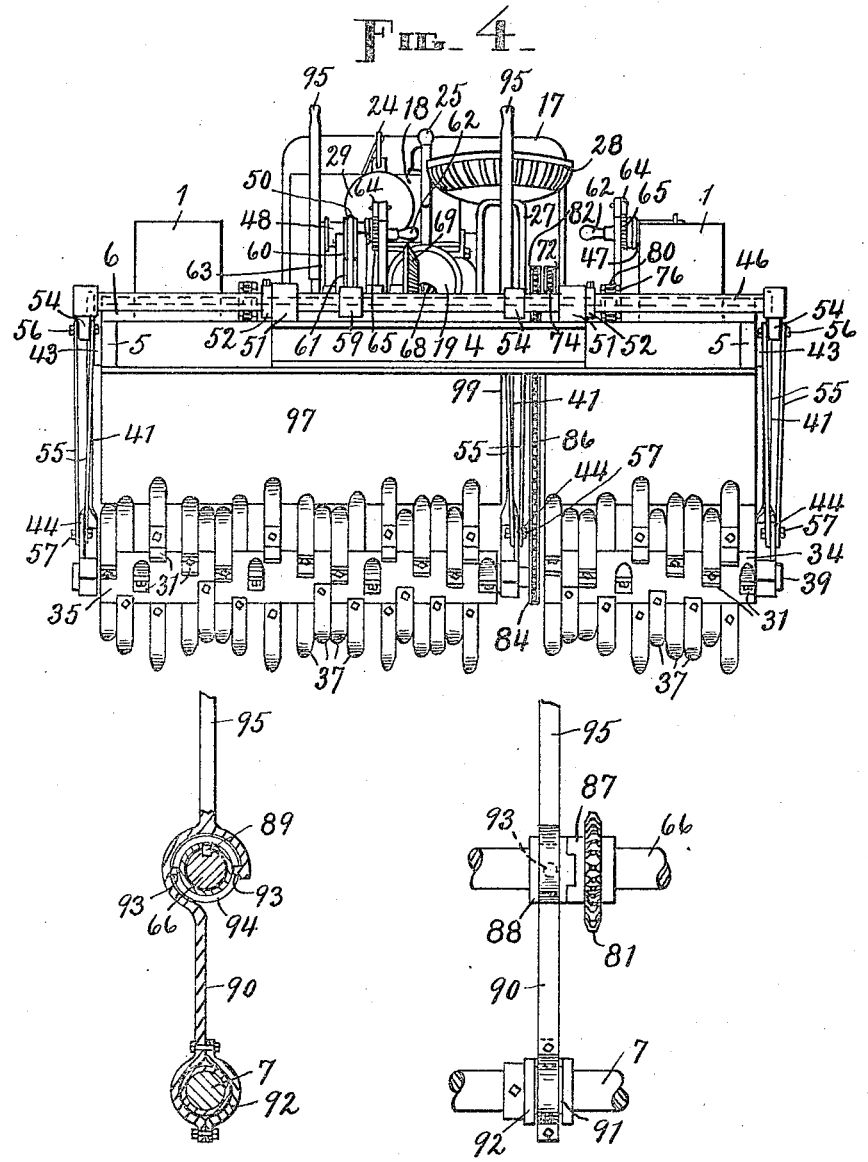

DANIEL F. HESSION, OF SPRINGFIELD, MASSACHUSETTS, ASSIGNOR TO HESSION TILLER & TRACTOR CORPORATION, OF DETROIT, MICHIGAN, A CORPORATION OF DELAWARE.

ROTARY TILLER.

1,262,792.  Specification of Letters Patent.  Patented Apr. 16, 1918.

Application filed February 20, 1917. Serial No. 149,746.

*To all whom it may concern:*

Be it known that I, DANIEL F. HESSION, a citizen of the United States of America, residing at Springfield, in the county of Hampden and State of Massachusetts, have invented a new and useful Rotary Tiller, of which the following is a specification.

My invention relates to improvements in machines for breaking up, overturning, plowing, or working land or soil to prepare the same for agricultural purposes, and consists of a self-propelled vehicle comprising a certain peculiar frame mounted on wheels, and front and rear rotary blade-provided digging members of novel construction and suspended, manipulated, and operated by means and in a manner which are novel, such digging members being carried by said vehicle, together with such other parts and members as may be necessary or desirable to render the machine or tiller complete and serviceable, all as hereinafter set forth.

This rotary tiller is in the nature of an improvement of the rotary tiller which forms the subject matter of my application for United States Letters Patent, Serial No. 49,438, or an adaptation of some of the principles involved in the first tiller to a tiller that is more especially designed for use within a more limited range. In short, the tiller which is the subject of the present application is a smaller machine than the other.

The primary object of my invention is, therefore, to produce a comparatively small and compact combined rotary plow and cultivator, that is, a rotary tiller, which is equipped with power adequate both for the propulsion of the machine over the ground and the operation of the digging elements, and also with convenient means of control for said elements as well as for the machine as a whole.

As hereinbefore intimated, this machine plows and cultivates at the same time, leaving the soil after once passing over it thoroughly broken up and even pulverized, to the required depth, smooth, and ready for the seed, assuming that planting be the object in view. The importance and value of this feature can not be too highly estimated.

Another object of my invention is to produce a machine of this kind which is strong and durable, simple, both structurally and operatively, so that no great amount of skill is required to take care of, drive and operate the same, and consists of parts that can be easily, quickly, and conveniently repaired or replaced in case breakage does occur.

A further object is to provide the machine with digging members which break up the ground throughout the entire effective width of the machine, that is, effective in the matter of digging, without leaving streaks of unworked soil anywhere within such width.

Other objects and advantages will appear in the course of the following description.

A preferred form or embodiment of the invention, whereby I attain the objects and secure the advantages of the same, is illustrated in the accompanying drawings, and I will proceed to describe the invention with reference to said drawings, although it is to be understood that the form, construction, arrangement, etc., of the parts in various aspects are not material and may be modified without departure from the spirit of said invention.

In the drawings, in which like numerals designate like parts throughout the several views, Figure 1 is a top plan of a machine which embodies my invention as aforesaid; Fig. 2, a side elevation of said machine, a single circumferential set of blade-arms and blades being shown, on each of the two digger rollers, in order to illustrate the digging members more clearly than would be the case if the other sets of blade-arms and blades, which would be seen normally, were included in the view; Fig. 3, a detail, in top plan on a smaller scale, of a portion of the frame, portions of said digger rollers, and the direct driving mechanism and the direct raising and lowering members for said rollers, showing the offset relationship of said mechanism and members; Fig. 4, a rear end elevation of the machine; Fig. 5, an enlarged detail in cross-section of one of the digger clutches, and, Fig. 6, an enlarged detail in rear elevation of the same clutch.

The digging members or diggers are represented in their lower or depressed and active or operative positions, as is plainly to be seen from Figs. 2 and 4.

The tiller comprises a vehicle and a motor or engine mounted thereon, rotary digging members supported from said vehicle and movable into and out of operative position, means to raise and lower said members, means to drive said vehicle and means to drive or rotate said digging members from said engine, and means to control said driving means. Steering means are also provided for the vehicle.

The vehicle comprises a body or frame which is mounted on a pair of rear wheels 1 and a pair of front wheels 2. The frame consists of an intermediate pair of long longitudinal beams 3 connected at the ends by cross beams 4, the front cross beam being shown only in Fig. 2 and there by dotted lines, a pair of short exterior longitudinal beams 5 connected at the ends by cross beams 6, the latter resting on said first-mentioned pair of longitudinal beams, and a middle pair of short longitudinal beams 30 which extend from the rear beam 4 to the front beam 6.

The rear wheels 1 are loosely mounted on an axle 7. Brackets 8, which depend from the undersides of the beams 3, are mounted on the rear axle 7.

The front wheels 2 are mounted on stub-axles 9—9 which are attached in the usual manner to a fixed axle 10 under the forward terminal of the narrow part of the frame. The axle 10 is rigidly attached, as by braces 11 and 12, Fig. 2, to the beams 3. The stub-axles 9 are provided with arms 13—13 and these are connected by a rod 14, as usual, and there is a steering-knuckle 15 provided for one of such stub-axles. A steering-post 16 is mounted in the frame, and the necessary connections between said steering-post and the steering-knuckle 15 are provided whereby the stub-axles 9 with the wheels 2 may be turned in either direction. These parts, both structurally and operatively, are all old and well known.

A radiator 17 is mounted at the extreme front end of the frame, and behind said radiator an engine 18 is mounted on said frame. At the rear of the engine 18 is a transmission case 19. Two sections of a transmission shaft are represented at 20 and 21, such sections being connected or coupled together by a universal-coupling 22. The shaft section 21, which is the rear section, has its back terminal journaled in a bearing 23 which is mounted crosswise on the beams 30. The journal bearings for the front shaft section 20 are in the case 19. The engine 18 is of the gasolene type, and neither said engine, nor the transmission in the case 19, which transmission with the exception of the shaft sections 20 and 21 and the coupling 22 is not shown in connection herewith, is in itself novel, since both are materially and essentially like any ordinary gasolene engine and its transmission. A throttle lever is represented at 24, a speed lever at 25, and a clutch lever at 26.

Mounted on a support 27, which latter rises behind the steering-post 16 from the forward beam 6, is a seat 28 for the operator. At 29 appears a fuel tank.

There are two diggers, one forward and the other in the rear, and each consists of a shaft, two cylinders secured to such shaft and provided with radial lugs 31, and curved blades bolted or otherwise secured to the inside or advance faces, in the direction of rotation, of said lugs. The aforesaid cylinders are designated by the numerals 32 and 33, 34 and 35, and the aforesaid blades by the numerals 36 and 37. The cylinders 32 and 34 are alike and the cylinders 33 and 35 are alike, but said cylinders 32 and 33 are constituent parts of the front digger and said cylinders 34 and 35 are constituent parts of the rear diggers. The front and rear digger shafts are respectively designated by the numerals 38 and 39. The cylinders 32 and 33 are secured in spaced relationship on the shaft 38, and the cylinders 34 and 35 are secured in spaced relationship on the shaft 39. Each of the cylinders 32 and 34 is shorter than either of the cylinders 33 and 35. Preferably the lugs 31 are arranged in rows lengthwise of the cylinders, with the lugs in each row in staggered relationship to each other, and those in one row in offset relationship to those in the two adjacent rows, so that the blades (36 or 37) in any row come into action progressively, and the blades in each succeeding row dig into the earth in the ridges left by the blades in the preceding row. The curved portions of the blades 36 and 37 project beyond the outer ends of the lugs 31. The blades 36, which form parts of the front digger, do the initial digging and are, therefore, shorter than the blades 37, which form parts of the rear digger. If such were not the case, too much work would be thrown on the front digger and an excessive or improperly distributed strain put on the machine, or else all of the blades would have to be too short to produce effective and successful results. As it is, however, the preliminary and shallower furrows are first dug by the forward blades and then such furrows are deepened to the necessary extent by the rear blades, which enables the strain on the machine and operating parts to be distributed in a substantially uniform manner.

The cylinders 32, 33, 34 and 35 are so arranged on their shafts 38 and 39, as clearly shown in Fig. 3, that the short cylinder 32 is in front of the long cylinder 35, and the short cylinder 34 is behind the long cylinder 33. It is now seen that the ground space between the front cylinders and their blades, which ground space is unbroken by the latter, is dug by the blades 37 on the long cylinder 35 behind. The ground space between the rear cylinders and their blades is not acted on, after being dug up by the blades 36 on the long forward cylinder 33 which are in front of such space, but this and the ground space between the front cylinders and their blades are so narrow in each case that no serious or even appreciable objection is found to digging the one solely with the longer section of the large digger and the other solely with the longer section of the smaller digger.

Owing to the length of the diggers it is practically necessary to support them intermediate of their ends, as well as at such ends, and to drive them at intermediate points as well, and it is for this reason that each of said diggers has two cylinders instead of one, as access is thus had to the digger shaft at an intermediate point. The reason for arranging the spaces between the digger cylinders or sections in offset relationship has already been fully explained, and I will now proceed to explain the manner in which the diggers are supported.

Two sets of swinging arms, there being three arms in each set, are provided for the digger shafts 38 and 39. Although these arms are practically alike, I have designated the three for the shaft 38 by the numeral 40 and the three for the shaft 39 by the numeral 41. The arms in the two sets have their inner ends pivoted on opposite sides or respectively in advance of and behind the vertical plane of the axle 7, at 42, to the frame. The shafts 38 and 39 are journaled in the outer ends of the arms 40 and 41. The outside arms 40 and 41 are pivoted at 42 to the upper terminals on the outsides of vertical ears or lugs 43 that are rigidly attached to the outer sides of the beams 5, while the inside or intermediate arms 40 and 41 are respectively pivoted at 42 to the upper terminals on the outsides of similar ears or lugs 43 that are rigidly attached to the outer sides of the beams 30. The outer or front end of the intermediate arm 40 engages the shaft 38 between adjacent ends of the cylinders 32 and 33, and the outer or rear end of the arm 41 engages the shaft 39 between adjacent ends of the cylinders 34 and 35. The arms 40 always have a more or less downward and forward slant from their pivots 42, while the arms 41 always have a more or less downward and rearward slant from their pivots 42. At the lower terminal of each of the arms 40 and 41 is a lug 44. The pivots 41 all have a common horizontal plane, and said pivots for the arms 40 have a common vertical plane, likewise said pivots for the arms 41.

The raising and lowering mechanism for the diggers comprises front and back rock-shafts 45 and 46, respectively, connections between the arms 40 and 41 and said rock-shafts, respectively, and operating means for said rock-shafts, such means here consisting of two windlasses 47 and 48 and two ropes 49 and 50. The rock-shafts 45 and 46 are journaled in bearings 51 which rise from the beams 3, said rock-shaft 46 being located over the rear terminals of said beams, and said rock-shaft 45 being located as far forward of the vertical plane of the axle 7 as said rock-shaft 46 is behind such plane. Collars 52 are secured to the rock-shafts 45 and 46, contiguous to the outer edges of the bearings 51, to hold said rock-shafts against endwise movement. The rock-shaft 45 is provided with three arms 53 that extend rearwardly and the rock-shaft 46 is provided with the same number of similar arms 54 that extend forwardly. The free end of each of the arms 53 and 54 is connected by a pair of links 55 with the adjacent swinging arm 40 or 41, or with the lug 44 of such swinging arm, the upper ends of such links being pivoted at 56 to their rocker-arm and at 57 to their swinging-arm lug. The rock-shaft 45 is provided further, adjacent to the windlass 47, with a downwardly-extending arm 58, to the lower end of which the front end of the rope 49 is made fast; and the rock-shaft 46 is provided further, in line with the windlass 48, with a downwardly-extended arm 59, to the lower end of which the rear end of the rope 50 is secured. The rope 49 passes directly to the windlass 47 from the rocker-arm 58, but the rope 50 passes from the rocker-arm 59 over a sheave 60 on the way to the windlass 48. The sheave 60 is mounted at the top of a bracket 61 which in turn is mounted on the back beam 6. The windlasses 47 and 48 are mounted at the right and left, respectively, of the seat 28, with their cranks 62 adjacent to said seat, in brackets 63 which are secured to the front beam 6. An ordinary pawl 64 and ratchet 65 are provided for each windlass.

It is now clear that the diggers can be raised or lowered at the ends of their supporting or carrying arms, such arms swinging on the pivots 42, through the medium of the links 55, the rocker-arms 53 and 54, rock-shafts 45 and 46, and rocker-arms 58 and 59, and the cords 49 and 50, and by means of the windlasses. In raising the forward digger, the handle 62 of the windlass 47 is grasped and said windlass rotated in the direction to wind up the rope 49, thus actuating the rock-shaft 45 in such a manner as to elevate said digger; and in raising the rear digger, the handle 62 of the windlass 48 is rotated in the direction to wind up the rope 50, thus actuating the rock-shaft 46 in such a manner as to elevate said rear digger. The pawls 64 automatically hold the windlasses against the strain put upon them by the ropes and so support the parts in whatever position they may be disposed. Upon releasing the ratchets 65 from the pawls 64, the windlasses are permitted to rotate to lower the diggers, as will be readily understood.

Taking up next the transmission, it will become obvious that such transmission is duplex, in the sense that from the single engine 18 the machine is propelled over the ground and the diggers are driven.

A shaft 66 is journaled directly over the axle 7 in bearings 67. The latter are mounted on the tops of the beams 3 and the left-hand beam 30. The transmission-shaft sections 20 and 21 are in the longitudinal center of the machine, and secured on the rear end of the section 21, behind the bearing 23, is a bevel pinion 68. This pinion intermeshes with a bevel gear 69 secured on the shaft 66. The shaft 66 is the main drive shaft of the machine, and in front of this shaft is a jack shaft 70. The shaft 70 is journaled in bearings 71 that are mounted on the tops of the beams 3 and the right-hand beam 30, and is driven from the main shaft 66 by means of a sprocket-wheel 72 secured on said main shaft, a sprocket-wheel 73 secured on said shaft 70, and a sprocket-chain 74 connecting said sprocket-wheels. The ends of the shaft 70 extend beyond the outer bearings 71 and have sprocket-wheels 75 secured thereon. A sprocket-wheel 76 is provided for each wheel 1, between such wheel and the beams 3, being rigidly and securely supported from said wheel by two braces or tie-rods 77. Each tie-rod 77 has the ends secured to the rim of the wheel 1 which carries it, on the inside, and the middle portion of such rod is projected inwardly away from the wheel and is received in a slotted lug 78 on the outside of the sprocket-wheel 76 that is attached to such wheel, and said lug is bolted to said tie-rod, as represented at 79. The sprocket-wheels 75 are forward of and in alinement with the sprocket-wheels 76. A sprocket-chain 80 connects each sprocket-wheel 75 with the sprocket-wheel 76 behind.

When motion is imparted to the main shaft 66, from the transmission shaft operating through the bevel pinion 68 and the bevel gear 69, such motion is transmitted from said main shaft to the wheels 1, through the medium of the sprocket-wheel 72, the sprocket-chain 74, the sprocket-wheel 73, the shaft 70, the sprocket-wheels 75, the sprocket-chains 80, and the sprocket-wheels 76. Thus the machine is propelled over the ground, both when the diggers are active and when they are inactive.

The diggers are rotated by means of sprocket-wheels 81 and 82 secured to the main shaft 66, sprocket-wheels 83 and 84 secured to the digger shafts 38 and 39, respectively, a sprocket-chain 85 connecting said sprocket-wheel 83 with said sprocket-wheel 81, and a sprocket-chain 86 connecting said sprocket-wheel 84 with said sprocket-wheel 82. The sprocket-wheel 83 is on the shaft 38 in the space between the cylinders 32 and 33, and the sprocket-wheel 84 is on the shaft 39 in the space between the cylinders 34 and 35, and the sprocket-wheels 81 and 82 are necessarily located on the shaft 66 in alinement, respectively, with said sprocket-wheels 83 and 84.

A clutch is provided for each of the sprocket-wheels 81 and 82. The two clutches are similar to each other and of ordinary construction. The clutches have male parts 87 to engage and release female parts 88 of the sprocket-wheels 81 and 82. Having special reference to Figs. 5 and 6, wherein I have shown the clutch which controls the sprocket-wheel 81, it will be seen that the male part 87 is mounted to rotate with and slide on the shaft 66, being keyed thereto at 89, and that an actuating lever 90 is provided for said part. Said lever is loosely mounted at the lower end in a groove 91 in a sleeve 92 made fast to the axle 7 under the associated male part or clutch member 87, and said lever is provided with pins 93—93 which are received in an annular groove 94 in said member. As before stated a similar clutch is provided for the sprocket-wheel 82. The lever 90 in each case is on the left-hand side of the sprocket-wheel which it controls, and when such lever is rocked to the left the connected clutch member 88 is disengaged from the contiguous part or member 87, thus permitting the latter to remain idle while the shaft 66 continues to revolve, while a movement to the right of said lever reëngages said clutch members and said member 87 is carried around with said shaft. Each lever 90 has an upwardly-extending part 95 to form a convenient handle for throwing in and out the clutch operated by said lever.

When the left-hand handle 95 is grasped and actuated to the right, the sprocket-wheel 81 is set in motion, assuming that the shaft 66 be in operation, and the front digger is caused to revolve, through the medium of the sprocket-chain 85 and the sprocket-wheel 83 on the shaft 38, and, upon actuating said handle in the opposite direction, the power is cut off from said digger and the same ceases to revolve. Similarly the rear digger is set in motion and stopped, the right-hand handle 95 being thrown to the left in the first instance and to the right in the second instance. The right-hand clutch, when thrown in, engages the sprocket-wheel 82 rotatably with the shaft 66, and said sprocket-wheel, acting through the sprocket-chain 86, causes the sprocket-wheel 84 and the shaft 39 to revolve.

Guards or shields 96 and 97 are provided underneath the frame, to which latter they are attached, to prevent the diggers when in active operation from throwing dirt into the mechanism. The shield 96 extends downwardly and rearwardly over the front digger and the shield 97 extends downwardly and forwardly over the rear digger. Slots 98 and 99 are provided in the shields 96 and 97, respectively, for the accommodation of the intermediate arms 40 and 41 and the sprocket-chains 85 and 86.

The operation of the tiller as a whole is briefly explained as follows:

The engine 18 is started and the transmission thrown in while the diggers are in elevated position with the blades 36 and 37 clear of the ground. The wheels 1 are thus set in motion the power being transmitted to them through the several shafts, gear members, sprocket-wheels and sprocket-chains previously described, and the tiller is propelled and guided to the place where the digging operation is to be performed. Upon arriving at that place the clutch handles 95 are grasped and the clutches thrown in, with the result that the diggers are set to revolving, by the means and in the manner already fully described. While the diggers are in motion the pawls 64 are actuated to release the ratchet-wheels 65, and, under proper manual control applied to the cranks 62, the windlasses 47 and 48 permit the ropes 49 and 50 to unwind, and said diggers descend by their own weight into operative position, the rock-shafts 45 and 46 turning in their bearings 51 by the action thereon of the diggers applied through the links 55. The arms 40 and 41 swing downwardly on their pivots 42 at this time. The blades 36 and 37 now cut into the soil, throw it up, and thoroughly pulverize it, and leave the same fully prepared for planting. Thus, as the tiller moves forward, the soil is both plowed and harrowed. The diggers have a tendency to dig their way into the ground, as it were, so there is no necessity of providing means to hold them down, but rather to restrain them from descending lower. The latter result is obtained by means of the pawls 64 which are permitted to reëngage the ratchet-wheels 65 as soon as the diggers have been lowered the desired distance. The diggers continue to revolve and do their work until such time as the clutches are thrown out, or the engine is stopped. Either digger can be stopped and started, or raised or lowered, independently of the other. At the end of the digging operation the diggers should be elevated before shutting down the engine.

Although the two axes common to the pivots 42 and the axis of the shaft 66 do not coincide, the difference is not great enough materially to affect the raising and lowering of the diggers. The sprocket-chains 85 and 86 are of sufficient length to permit the diggers to be lowered to the maximum extent, when they are supported by the pawl and ratchet mechanism so that no undue strain is put upon said sprocket-chains. When the diggers are elevated the sprocket-chains 85 and 86 become a little loose, owing to the shortening of the radius common to the sprocket-wheels 81 and 83, 82 and 84, but said sprocket-chains do not become loose enough to run off of said sprocket-wheels. In this connection it is to be noted that the axes of the arms 40 and 41, or of the pivots 42, and the axis of the shaft 66 are all in the same horizontal plane, and that the vertical plane of the shaft axis is central to the vertical planes of the two lines of arm axes.

The forward terminal portions of the beam 3 are drawn inwardly toward the longitudinal center of the machine, as represented at 100—100.

The sprocket-wheels 75 are much smaller than the sprocket-wheels 76, for obvious reasons.

The running parts of this machine are reversible, that is, they can be run either forward or backward, wherefore said machine can be propelled in either direction.

What I claim as my invention, and desire to secure by Letters Patent, is—

1. In a rotary tiller, a vehicle frame comprising long intermediate beams, short exterior beams, and short intermediate beams between said first-mentioned beams, wheels and an axle upon which said frame is mounted, said wheels being between said first-mentioned and said second-mentioned beams, front and rear diggers pivotally supported from said second-mentioned beams, and means, supported by said frame, to drive said wheels.

2. In a rotary tiller, a vehicle frame comprising long intermediate beams, short exterior beams, and short intermediate beams between said first-mentioned beams, wheels and an axle upon which said frame is mounted, said wheels being between said first-mentioned and said second-mentioned beams, front and rear rotary diggers pivotally supported from said long intermediate and said short exterior beams, and means, supported by said frame, to drive said diggers.

3. In a rotary tiller, a vehicle frame comprising long intermediate beams, short exterior beams, and short intermediate beams between said first-mentioned beams, wheels and an axle upon which said frame is mounted, said wheels being between said first-mentioned and said second-mentioned beams, front and rear diggers pivotally supported from said second-mentioned beams, and means, supported by said frame, to raise and lower said diggers.

4. A rotary tiller comprising a vehicle, a front axle member supported from said vehicle and having digger members of unequal lengths fixed thereon, a rear axle member supported from said vehicle and having digger members of unequal lengths fixed thereon, the longer digger member of one pair and the shorter digger member of the other pair being arranged in offset relationship, means to elevate and depress said diggers and means to rotate said diggers.

5. The combination, in a rotary tiller, with a frame, a supporting axle for said frame, and wheels on said axle, of forwardly and rearwardly extending arms mounted to swing from said frame, said forwardly-extending arms, at their inner ends, having a common axis, and said rearwardly-extending arms, at their inner ends, having a common axis, front and rear diggers carried by said arms at their outer ends, a main shaft mounted on said frame, the axes of said arms and shaft being approximately in the same horizontal plane, and the vertical plane of said shaft axis being between the vertical planes of said arm axes, and means to drive said shaft, means to drive said diggers from said shaft, and means to raise and lower said diggers with said arms.

6. The combination, in a rotary tiller, with a frame, an axle under said frame, and wheels on said axle, of forwardly and rearwardly extending arms mounted to swing from said frame, said forwardly-extending arms, at their inner ends, having a common axis, and said rearwardly-extending arms, at their inner ends, having a common axis, front and rear diggers carried by said arms at their outer ends, a main shaft mounted on said frame, the axes of said arms and shaft being approximately in the same horizontal plane, and the vertical plane of said shaft axis being between the vertical planes of said arm axes, means to drive said shaft, and means to drive said diggers from said shaft.

7. The combination, in a rotary tiller, with a frame, a supporting axle for said frame, and wheels on said axle, of forwardly and rearwardly extending arms mounted to swing at their inner ends from said frame, front and rear diggers carried by said arms at their outer ends, a main shaft mounted on said frame above said axle, means to drive said shaft, a second shaft mounted on said frame, means to drive said second shaft from said main shaft, means to drive said wheels from said second shaft, and means to drive said diggers from said main shaft.

8. The combination, in a rotary tiller, with a frame, a supporting axle for said frame, and wheels on said axle, of forwardly and rearwardly extending exterior and intermediate arms mounted to swing from said frame, front and rear diggers carried at the outer ends of said arms, such front digger comprising an axle member having digger members, of unequal lengths, fixed thereon and spaced apart, and such rear digger comprising an axle member having digger members, of unequal lengths, fixed thereon and spaced apart, the spaces between the two pairs of such digger members being in offset relationship, and said intermediate arms being connected with said axle members in such spaces, and means to raise and lower said diggers with said arms.

9. The combination, in a rotary tiller, with a frame, a supporting axle for said frame, and wheels on said axle, of forwardly and rearwardly extending exterior and intermediate arms mounted to swing from said frame, front and rear diggers carried at the outer ends of said arms, such front digger comprising an axle member having digger members, of unequal lengths, fixed thereon and spaced apart, and such rear digger comprising an axle member having digger members, of unequal lengths, fixed thereon and spaced apart, the spaces between the two pairs of such digger members being in offset relationship, and said intermediate arms being connected with said axle members in such spaces, a shaft mounted on said frame, means to drive said shaft, and means to drive said axle members from said shaft, such means also being connected with said axle members in such spaces.

10. The combination, in a rotary tiller, with a frame, a supporting axle for said frame, and wheels on said axle, of forwardly and rearwardly extending arms mounted to swing from said frame, front and rear diggers carried by said arms at their outer ends, a shaft mounted on said frame over said axle, means to drive said diggers from said shaft, and means mounted on said axle and shaft, to disconnect such digger-driving means from said shaft.

DANIEL F. HESSION.

Witnesses:
ROBT. J. MCCALLUM,
WILLIAM STICKLES.